UNITED STATES PATENT OFFICE.

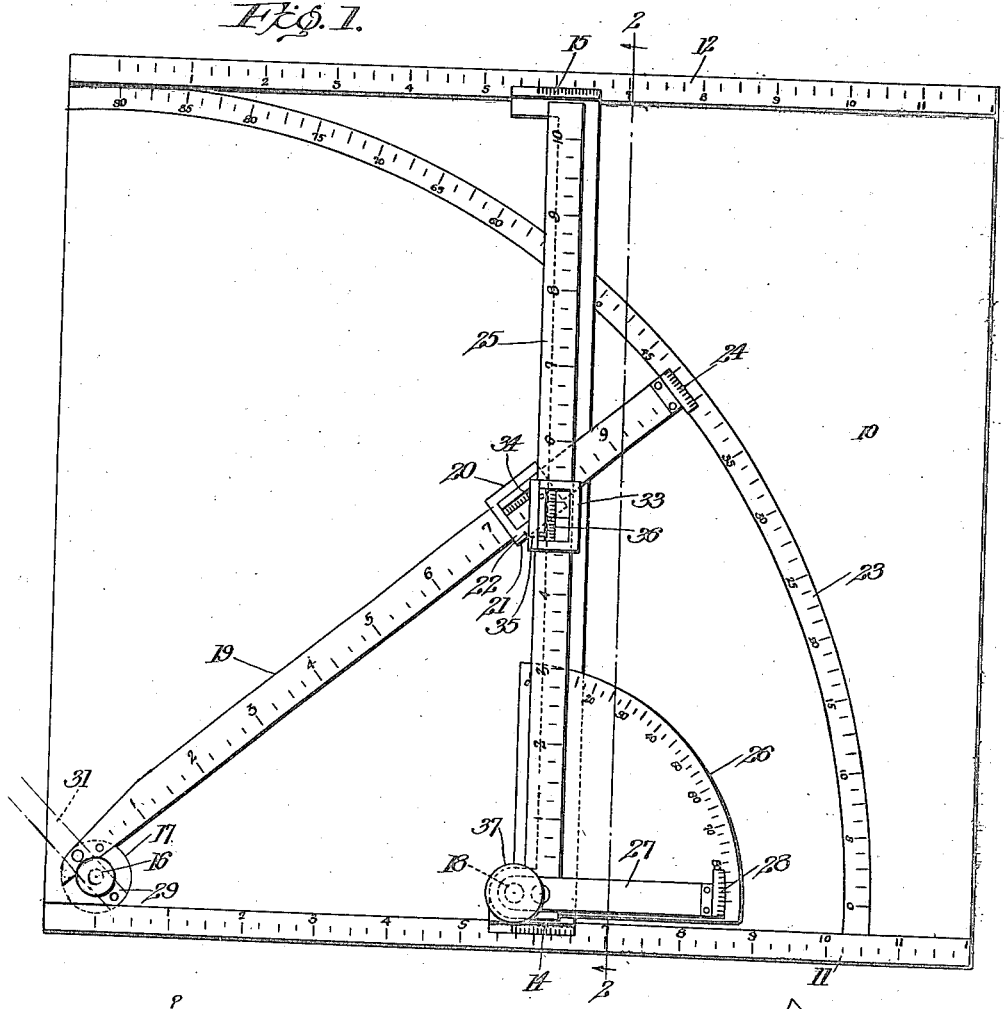

WILLIAM N. REAZOR, JR., OF ELMIRA, NEW YORK.

ANGLE-CALCULATOR.

1,302,590.　　　　　Specification of Letters Patent.　　Patented May 6, 1919.

Application filed February 2, 1918. Serial No. 215,063.

*To all whom it may concern:*

Be it known that I, WILLIAM N. REAZOR, Jr., a citizen of the United States, and resident of Elmira, county of Chemung, State of New York, have invented a new and useful Improvement in Angle-Calculators, of which the following is a specification.

This invention relates to calculating devices and more particularly to devices for solving problems relating to triangles.

One of the objects of the invention is to provide a device of this class which will be adapted for the solution of problems relating to the various forms of triangles met with in engineering and shop work, and be accurate, easily operable and comparatively simple and inexpensive.

Other objects and the features of novelty will be apparent from the following description taken in connection with the accompanying drawings, of which, Figure 1 is a plan view of a device embodying the invention;

Fig. 2 is a section on line 2—2 of Fig. 1;

Fig. 3 is a plan view of a removable scale used in the solution of certain kinds of triangles;

Figs. 4 and 5 are triangles, the solution of which by my invention, is hereinafter described.

Referring to the drawings, 10 indicates a board or base for the other parts of the device. A base scale 11 is fixed on the base 10, and a parallel scale 12 is preferably arranged at the opposite side of base 10. A bar 13 is slidably arranged on scales 11 and 12 at right angles thereto. The bar 13 is preferably provided, at its ends, with verniers 14 and 15 to coöperate with the scales 11 and 12, respectively. A fixed pivot 16 is provided adjacent the zero mark on scale 11 and a plate 17 is arranged to turn on this pivot. The bar 13 carries a pivot 18 so placed that its line of movement extends through the pivot 16 or, in other words, the pivots 16 and 18 are arranged with their axes equidistant from the base scale 11. A scale arm 19 is secured to the plate 17 and carries a runner 20 having a vernier to coöperate with the scale on arm 19. The edge 21 of the runner 20 is in alinement with the axis of pivot 16, and an index or hairline 22 is provided on the runner at this edge. A protractor 23 is provided on the base 10, about the pivot 16, and the end of the scale arm 19 has a vernier 24 for coöperation with this protractor.

A scale arm 25 is arranged on the pivot 18 and moves with the bar 13 relatively to the base scales 11 and 12. The bar 13 carries a protractor 26 which is arranged about the pivot 18 and an arm 27 extending from the arm 25 has a vernier 28 arranged to coöperate with the protractor 26 to indicate the angular relation of the scale arm 25 to the base scale 11.

The plate 17 has a slot 29 extending across its upper surface and at right angles to the scale arm 19. The slot 29 is adapted to receive the end 30 of the detachable scale arm 31, which is preferably marked in the same manner as scale arm 19.

A runner 33 is provided on the scale arm 25, the edge 34 of the runner alining with the pivot 18, and an index or hairline 35 is arranged on this edge. The runner 33 is also provided with a vernier 36 adapted to coöperate with the scale on arm 25. A thumb nut 37 is provided on the pivot 18 to clamp the scale bar 25 in any position to which it may be set.

The operation of the device is as follows: The scale bar 31 is ordinarily omitted as it is not necessary for solving problems relating to more common forms of triangles. In Fig. 5, there is illustrated a common form of triangle, all of the sides of which are of known dimensions, the included angles, however, being unknown. In the solution of this triangle, the bar 13 is shifted so that its indexes will register with the numbers 17.97 on scales 11 and 12, the verniers 14 and 15 being employed to accurately position the bar 13. The scale 11 then represents the side $b'$ of the triangle. The runner 20 is then adjusted to the value 13.83 on the scale arm 19, this arm then representing the side $a'$ of the triangle. The runner 33 is adjusted on scale arm 25 to the value 21.69 so that this scale arm will represent the side $c'$ of the triangle. The scale arms 19 and 25 are then swung on their respective pivots until edges of the runners 20 and 33 coincide at the indexes 22 and 35. The angle between the sides $a'$ and $b'$ may then be read from the protractor 23, and the angle between the sides $b'$ and $c'$ may be read from the protractor 26. The angle between sides $a'$ and $c'$ may, of course, be readily formed by subtracting the sum of the other two angles from 180°.

To solve the triangle shown in Fig. 4, the scale arm 31 is secured in position on the plate 17 as shown in broken lines in Fig. 1. The bar 13 is then set at 6.8 on scales 11 and 12 so that scale 11 will represent the side $b$ of the triangle. The scale arm 25 is then swung on the pivot 18 until the vernier 28 indicates 20°–17′ on the protractor 26. The runner 33 is thus adjusted on the scale arm 25 to the value 10.2 of the side $c$ of the triangle. The scale arms 19 and 31 and the runner 20, which in this case will be placed on scale arm 31, are adjusted until the edges of the runners 20 and 33 coincide at the indexes 22 and 35. The angle between the sides $a$ and $b$ may then be read, obtained by adding 90° to the indication on the protractor 23, and the value of the side $a$ may be read from the scale arm 31. The value of the angle between the sides $a$ and $b$ may then be ascertained by subtracting the sum of the other two angles from 180°.

Having described the invention what is claimed is:

1. In a device of the class described, the combination of a base scale, a fixed pivot, a pivot movable in a line parallel with said base scale and which extends through said fixed pivot, two right angularly arranged scale arms movable on said fixed pivot, a protractor in fixed relation with said base scale and coöperating with one of said scale arms to measure the angle between the latter and the base scale, a scale arm arranged to swing on said movable pivot, and means for measuring the angular relation of the last-mentioned scale arm and said base scale.

2. In a device of the class described, the combination of a base scale, a fixed pivot, a pivot movable in a line parallel with said base scale and which extends through said fixed pivot, two right angularly arranged scale arms movable on said fixed pivot, a protractor in fixed relation with said base scale and coöperating with one of said scale arms to measure the angle between the latter and the base scale, a scale arm arranged to swing on said movable pivot, a protractor movable with said movable pivot, and means on the last-mentioned scale arm adapted to coöperate with the last-mentioned protractor for measuring the angular relation of this scale arm and said base scale.

In testimony whereof I affix my signature.

WILLIAM N. REAZOR, Jr.